Sept. 22, 1931.  M. TIBBETTS  1,824,513

WRITING SURFACE FOR RECORDING INSTRUMENTS

Filed Oct. 20, 1926

Inventor

MILTON TIBBETTS.

By Milton Tibbetts

Attorney

Patented Sept. 22, 1931

1,824,513

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

WRITING SURFACE FOR RECORDING INSTRUMENTS

Application filed October 20, 1926. Serial No. 142,813.

This invention relates to motor vehicles and more particularly to writing surfaces for recording instruments therefor.

In the proper care of motor vehicles, it is desirable to change the engine oil at the end of a given number of miles of engine work. In fact to obtain the greatest efficiency and to prolong the life of an engine the changing of the oil at predetermined mileage becomes of paramount importance. Therefore, it is necessary or desirable to maintain a record for ready reference showing the number of miles indicated by the odometer when the engine oil was last changed or the number of miles the odometer will indicate when it will become necessary to again change the engine oil. Various methods have been adopted for this purpose, the usual method being to paste a sticker or tag upon the face of the speedometer upon which the number of miles is indicated. Such pasters are unsightly and in addition thereto are not always available at the time required.

The desirability of maintaining such a record associated with the odometer becomes apparent and to maintain such a record in the least unsightly yet most efficient and convenient manner becomes an object of this invention.

Another object of the invention is to provide a readily accessible means associated with an odometer for recording data pertaining to the use thereof.

Another object of the invention is to provide a convenient means of recording a temporary record for use at a predetermined period which may be easily expunged when it becomes necessary or desirable to make a new entry.

A further object of the invention is to provide a readily accessible and convenient means whereby a temporary record may be easily and quickly made with a lead pencil or crayon upon the glass cover of a combined speedometer and odometer to be associated with and used in conjunction with the odometer and to so arrange and construct such means that the record will be clearly legible.

A still further object of the invention is to provide a recording instrument having a dark face or dial with a glass cover having inscribed thereupon indicia and a panel associated therewith etched upon the face of the glass covering, whereby the recording of data with a lead pencil or crayon may be easily accomplished, and a corresponding oppositely disposed light surface upon the back of the glass cover to render the recorded data more easily visible.

Other objects of the invention will appear from the following description taken in connection with the accompanying drawings which form a part of this specification and in which.

Figure 1:
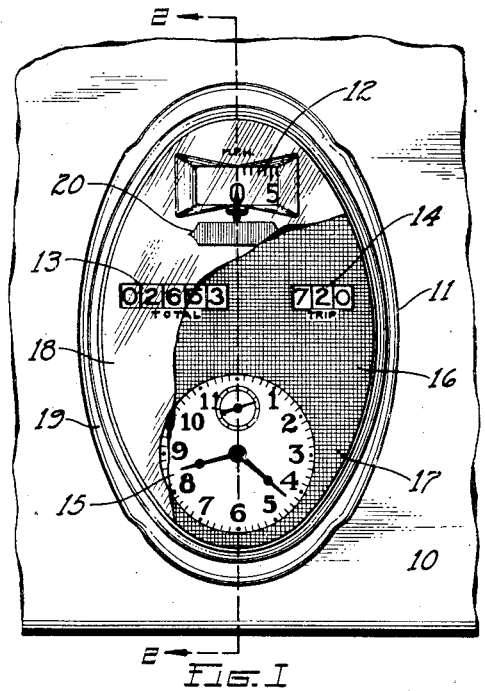
Fig. 1 is a front elevation of a speedometer having associated therewith an odometer and a clock, the whole arranged within a case provided with a glass cover, the cover being equipped with my invention and partly broken away to display the dial or face of the instrument.
Figure 2:
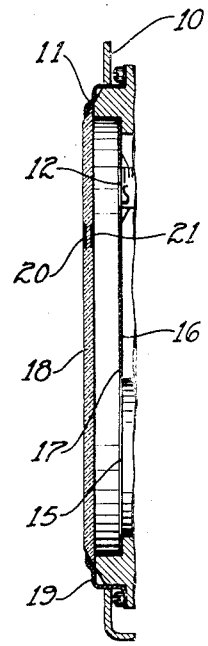
Fig. 2 is a vertical sectional view taken on line 2—2 of Fig. 1, broken away back of the face plate.

Referring by numerals to the drawings, 10 represents a portion of an instrument board of a motor vehicle. Mounted upon the instrument board is an instrument 11 comprising a speedometer the dial of which is indicated at 12, an odometer the dial of which is indicated at 13 and 14 respectively and a clock the dial of which is shown at 15. The face 16 of the instrument is shown in black as indicated at 17. That is, that portion of the face surrounding the dials of the speedometer, odometer and clock is in black to provide a background designed to accentuate or to display more prominently the respective dials. Instrument faces of this character are well known in the art and have been adopted by various manufacturers.

The face 17 of the instrument 11 is provided with a glass cover 18 mounted in a suitable rim 19. Arranged upon the front of the glass preferably beneath the dial 12 of the speedometer is a panel 20 and a like panel 21 is arranged upon the back or opposite side of the glass, oppositely disposed with respect to or registering with the panel 20.

These panels which are oppositely disposed with respect to each other are etched upon the glass cover 18 or they may be otherwise formed to produce a light or a roughened surface. The etching of the panels may well be accomplished simultaneously or one after the other without any loss of time before or after the operation of etching. Data are easily recordable upon the front panel 20 with a lead pencil or crayon, the same being readily erasable by one's finger, a rubber eraser or any other convenient means.

The arrangement of the panels 20 and 21 in their oppositely disposed relation obscures or obliterates that portion of the dark or black face 17 directly beneath the panels and presents a dense dull light background upon which the data recorded upon the panel 20 will be more easily visible, than would be the case where a panel was etched on one surface only.

Figure 3:
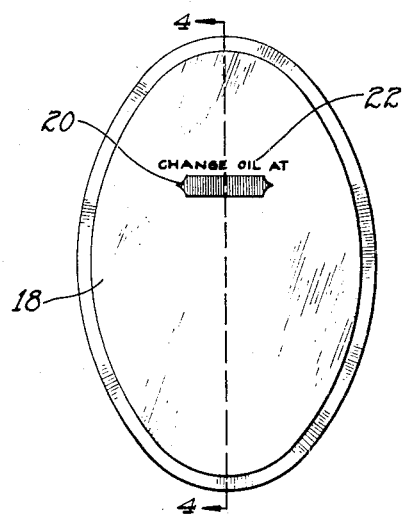
Fig. 3 is a front elevation of a glass cover illustrating a modified form of the invention.
Figure 4:
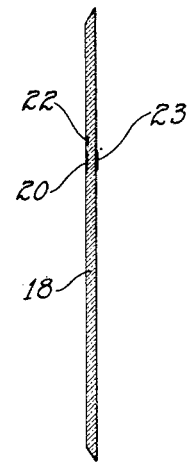
Fig. 4 is a vertical sectional view taken on line 4—4 of Fig. 3.

In Figs. 3 and 4 I have shown a modified form of my invention wherein the glass cover 18 is provided with an etched panel 20 over which are arranged indicia 22 reading "Change oil at". The object is to record upon the panel the mileage which will be indicated by the odometer at which it will be necessary to change the engine oil. It is, of course, obvious that the reverse of this indicia might well be used, as for instance "Oil was changed at" and a lead pencil record upon the panel as to the number of miles indicated by the odometer when the oil was changed.

In order that the data recorded upon the panel 20 may be more clearly and easily visible, there is painted or otherwise prepared on the back of the glass directly opposite the panel 20 a prepared light surface or panel 23 corresponding in contour to the panel 20. The prepared panel 23 adds density to the background of the panel 20 and thereby intensifies and reflects the data recorded thereupon and in addition thereto obscures or obliterates the dark or black face of the instrument which would otherwise be visible through that portion of the cover upon which the panels are or may be arranged.

While I have shown and described the preferred embodiment of my invention, I wish it to be understood that I do not confine myself to the precise details of construction herein set forth, by way of illustration, as it is apparent that many changes and variations may be made therein by those skilled in the art, without departing from the spirit of the invention or exceeding the scope of the appended claims.

Having thus described my invention what I claim as new and desire to secure by Letters Patent is:

1. In a recording instrument, the combination of a dark face for said instrument, a transparent cover over and adjacent to the dark face, an etched panel on the outside of said cover for recording data, and a reflector panel on the inside of said cover and between the etched panel and the dark face whereby the reflector panel obscures the dark face and reflects and intensifies the recorded data.

2. A glass cover having a roughened panel on one side, and in registry with the same as seen from said one side a roughened panel on the other side.

3. A transparent glass cover having upon a portion of one face a roughened panel and upon its other face an obscuring panel in registry with the first mentioned panel.

In testimony whereof I affix my signature.

MILTON TIBBETTS.